United States Patent [19]

Haisma et al.

[11] Patent Number: 5,622,525
[45] Date of Patent: Apr. 22, 1997

[54] METHOD OF POLISHING A SURFACE OF COPPER OR AN ALLOY COMPRISING MAINLY COPPER

[75] Inventors: Jan Haisma; Peter W. De Haas; Dirk K. G. De Boer, all of Eindhoven; Waltherus W. Van den Hoogenhof, Almelo; Lambertus Postma, Eindhoven, all of Netherlands

[73] Assignee: U.S. Philips Corporation, New York, N.Y.

[21] Appl. No.: 213,768

[22] Filed: Mar. 16, 1994

[30] Foreign Application Priority Data

Jul. 12, 1993 [BE] Belgium ............................. 09300716

[51] Int. Cl.$^6$ ............................................. B24B 1/00
[52] U.S. Cl. .................... 451/41; 451/28; 451/36
[58] Field of Search .................... 451/28, 41, 36

[56] References Cited

U.S. PATENT DOCUMENTS

| | | | |
|---|---|---|---|
| 3,485,608 | 12/1969 | Cecil | 51/308 |
| 3,662,500 | 5/1972 | Mendel | 51/281 SF |
| 4,057,939 | 11/1977 | Basi | 51/281 R |
| 5,096,854 | 3/1992 | Saito et al. | 51/283 R |
| 5,230,833 | 7/1993 | Romberger et al. | 51/283 R |
| 5,352,277 | 10/1994 | Sasaki | 51/298 |

*Primary Examiner*—D. S. Meislin
*Assistant Examiner*—Eileen P. Morgan
*Attorney, Agent, or Firm*—John C. Fox

[57] ABSTRACT

Method of polishing a surface (5a) of copper or an alloy comprising mainly copper, in which a polishing means is moved across the surface while exerting a polishing pressure of approximately 500 g/cm$^2$ for obtaining a plane and smooth polished surface without any defects. A composition of a polishing component comprising a colloidal suspension of SiO$_2$ particles having an average particle size of between 20 and 50 nm in an alkali solution, demineralized water and a chemical activator is used as a polishing means.

12 Claims, 3 Drawing Sheets

METHOD OF POLISHING A SURFACE OF COPPER OR AN ALLOY COMPRISING MAINLY COPPER

BACKGROUND OF THE INVENTION

The invention relates to a method of polishing a surface of copper or an alloy comprising mainly copper, in which a polishing means and said surface are moved with respect to each other while exerting a polishing pressure for obtaining a polished surface.

It is generally known to polish a copper surface mechanically by means of polishing grains. Although a satisfactory planeness can generally be achieved in this way, the polished surface has many grooves and scratches when viewed microscopically. Moreover, mechanical polishing causes material disturbances under the polished surface. A mechanically polished surface is unsuitable for many uses such as, for example direct bonding or for high-grade reflectors. Moreover, in the manufacture of layered high-tech products, such as thin-film magnetic heads, very plane and smooth polished surfaces without defects are required.

OBJECTS AND SUMMARY OF THE INVENTION

It is an object of the invention to provide a method of polishing a surface of copper or an alloy comprising mainly copper, in which a polishing means is moved across the surface to be polished while exerting a polishing pressure, with which method a surface which is substantially plane, smooth and without defects can be obtained.

To this end the method according to the invention is characterized in that a composition of a polishing component comprising a colloidal suspension of $SiO_2$ particles having an average particle size of between 20 and 50 nm in an alkali solution, demineralised water and a chemical activator is used as a polishing means, while a polishing pressure of between 400 and 600 $g/cm^2$ is exerted by means of a polishing base absorbing a polishing means, which polishing base has a hardness in the range between Shore A hardness 40 and Shore D hardness 90. The Shore A and D hardnesses are defined in DIN 53505.

It has been found that the use of the method according to the invention for copper or alloys comprising mainly copper such as brass or bronze yield substantially plane polished surfaces without defects, with surface roughnesses R (rms) of less than 2 nm being achievable. It is assumed that the particles used have an optimum size and hardness for polishing copper and copper alloys without damaging the material structure. The chemical activator is used for optimizing oxidation. Physical, chemical and mechanical parameters play a role in the method according to the invention. The polishing pressure is an external magnitude with which the method can be controlled and optimized. Said polishing pressure yields an optimum result because a lower pressure is a too great advantage for the chemical aspect and yields a slightly rough surface, while a higher pressure is a too great advantage for the mechanical aspect, which in turn also results in a rougher surface. The polishing base retains the polishing means during polishing and thus ensures, inter alia an optimum wetting of the surface to be polished. A tissue of organic fibres or a polishing cloth of pressed organic fibres is preferably used. The hardness of the polishing base is extremely important for optimizing the method according to the invention.

It is to be noted that a mechano-chemical polishing means is known under the trade name of Syton which comprises $SiO_2$ nanoparticles in a basic solution. In itself, i.e. without said additions as mentioned in the description of the method according to the invention, this means is not suitable for accurately polishing surfaces of copper or copper alloys. The above-mentioned means is mentioned, inter alia in U.S. Pat. No. 3,485,608 (herewith incorporated by reference) which describes a method of polishing silicon wafers.

An embodiment of the method according to the invention is characterized in that the polishing component comprises approximately 50% by weight of $SiO_2$ particles and approximately 50% by weight of solution having a pH of approximately 10. The pH of approximately 10 is controlled by means of the alkaline addition whose concentration is approximately $10^{-4}$ molar.

An embodiment of the method according to the invention is characterized in that 60 to 100 units by volume of demineralised water and 25 to 50 units by volume of chemical activator are used for every 100 units by volume of polishing component. In the case of relatively ductile materials, such as copper, coagulation of the polishing means should be prevented during the polishing operation, while there should still be a chemical effect. The degree of dilution as proposed in the method according to the invention complies with this. The aspect of the chemical effect may be further optimized.

An embodiment of the method according to the invention is characterized in that a hydrogen peroxide, an organic peroxide or a hypochlorite is used as a chemical activator. Such a chemical activator increases, for example by oxidation, the desorption of the material released during polishing and causes this material to dissolve. This is in contrast to the local plastic deformation of the material on the surface, as is the usual phenomenon in purely mechanical polishing methods.

An embodiment of the method according to the invention is characterized in that the method starts from a substrate on which a layer having a surface of copper or an alloy comprising mainly copper is formed. This embodiment, in which an electrically conducting layer may be structured, is particularly suitable for use in the manufacture of planar thin-film magnetic heads in which strict requirements as regards smoothness, planeness and condition, particularly physical condition of polished surfaces are imposed. In thin-film magnetic heads a structured layer formed as a write and/or test winding generally occurs. Notably in the case of a write winding, the layer should have a low resistance, for example less than 1 Ohm. The method according to the invention provides the possibility of using narrow, relatively thick windings, in which the layer is embedded in the substrate. A hard ferrite can be used without any problem as a substrate material.

An embodiment of the method according to the invention is characterized in that a non-magnetic layer is deposited on the polished surface obtained for forming a transducing gap of a magnetic head. Due to the accurate polished surface which is present, the non-magnetic layer may be perfectly smooth without any thickness variations when using the method according to the invention and may thus have an accurately defined thickness. The thickness of the non-magnetic layer determines the writing behaviour of the magnetic head obtained. For example, $SiO_2$ or $ZrO_2$ may be used as a material for the non-magnetic layer, which material may be deposited by PE-CVD or sputtering, respectively. By using a recessed conductor, the thickness of the non-magnetic layer can also be chosen freely for a small write gap. In the case of a non-recessed conductor, thick insulation layers must be provided so as to ensure satisfactory step coatings and to prevent short-circuits between the conductor and the magnetic yoke of the magnetic head, which thick insulation layers must be re-etched at a later stage to the correct thickness so as to realise the desired write gap.

The invention also relates to a magnetic head obtainable by means of the method according to the invention. The thin-film magnetic head obtained may be a read and/or write head. In the case of a read head a high efficiency is required. To this end a recess or a groove can be provided in a magnetic substrate when using the method according to the invention. Copper or an alloy comprising mainly copper is deposited in the recess so as to form an electric conductor, whereafter a planarization process is carried out, using the method according to the invention for obtaining a polished surface. The electric conductor is embedded in the magnetic substrate of the magnetic head thus obtained.

The invention also relates to an X-ray radiation-collimating element having a surface polished by means of the method according to the invention.

The invention also relates to an X-ray radiation-reflecting element having a surface polished by means of the method according to the invention.

Said elements may be used, for example as elements limiting the radiation divergence and may function as a reference for surfaces. It is therefore important that said elements have an optimally defined surface quality.

The invention further relates to a polishing means which is suitable for use in the method according to the invention.

The polishing means according to the invention is characterized by the presence of a polishing component comprising a colloidal suspension of $SiO_2$ particles having an average particle size of between 20 and 50 nm in an alkali solution, demineralised water and a chemical activator, in which 60 to 100 units by volume of demineralised water and 25 to 50 units by volume of chemical activator are present for every 100 units by volume of polishing component. The alkali solution may be KOH or NaOH. Experiments have proved that the surface roughness of the polished surface remains within a limit of 2 nm within said limits of composition of the polishing means. It has furthermore been found that the polished surface has a smoothness with which direct bonding can be realised.

A practical embodiment of the polishing means according to the invention is characterized in that the polishing component comprises approximately 50% by weight of $SiO_2$ particles, in which the solution has a pH of substantially 10.

An embodiment of the polishing means according to the invention is characterized in that the chemical activator is a substance from the group formed by hydrogen peroxide, organic peroxides and hypochlorites. To optimize the chemical aspect of this method, viz. the dissolution of material released during polishing, addition of this chemical activator is necessary.

BRIEF DESCRIPTION OF THE DRAWING

These and other aspects of the invention will be apparent from and elucidated with reference to the embodiments described hereinafter.

In the drawings

DESCRIPTION OF THE PREFERRED EMBODIMENTS

Figure 1:
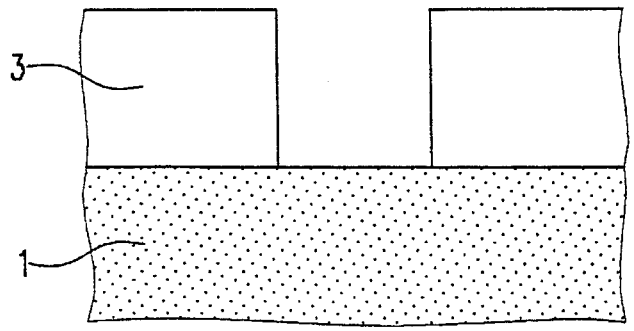
FIGS. 1 to 8 illustrate stages in a method of manufacturing a planar magnetic head, according to one embodiment of the invention.
Figure 2:
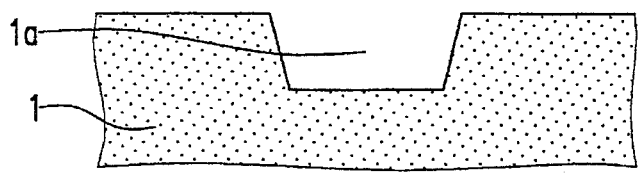
Figure 3:
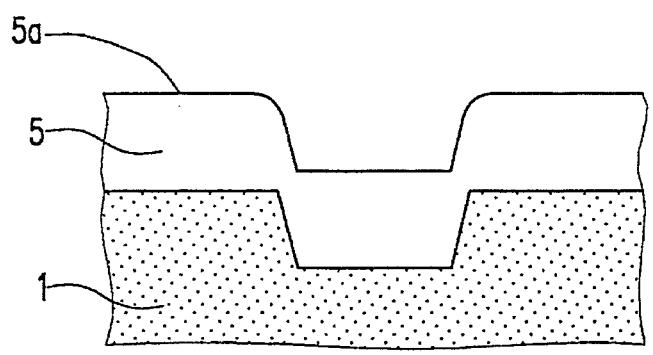
Figure 4:
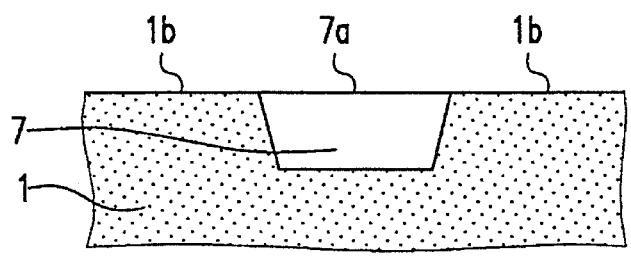
Figure 5:
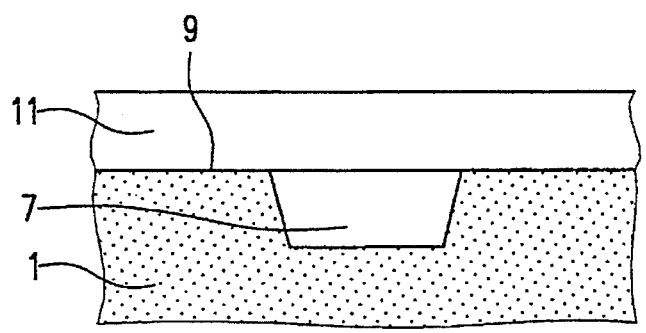
Figure 6:
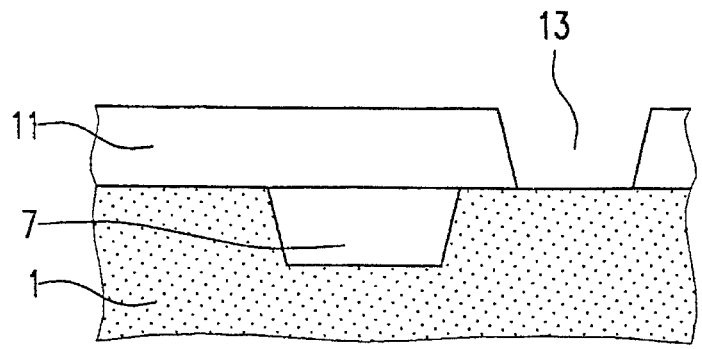
Figure 7:
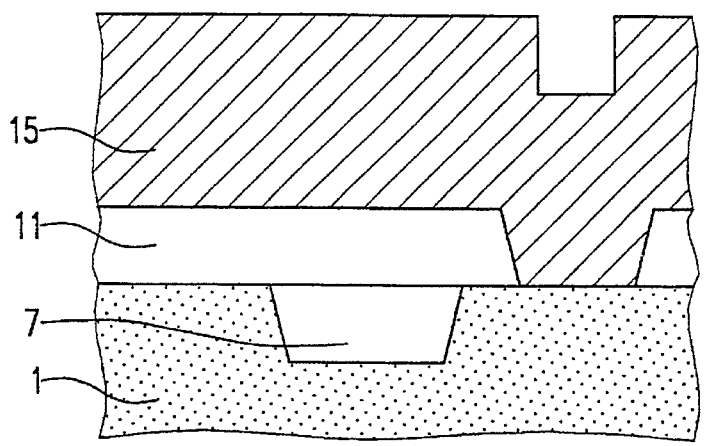
Figure 8:
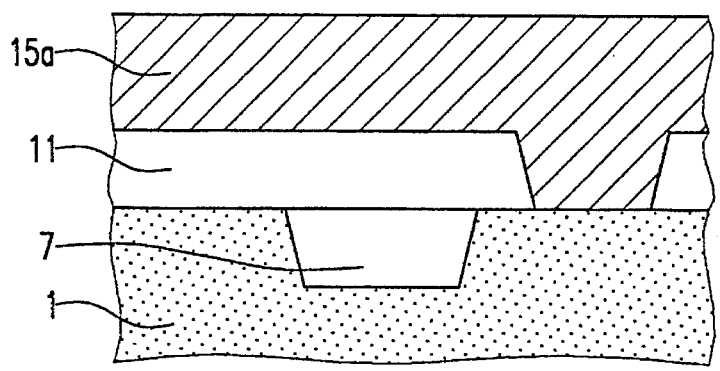

A method of manufacturing a thin-film magnetic head, using an embodiment of the method according to the invention will be described with reference to FIGS. 1 to 8. The method starts from a soft-magnetic substrate 1, in this embodiment a ferrite such as NiZn ferrite having a smooth and plane substrate surface on which a mask 3, in this embodiment a mask of nickel is formed by successive deposition and structuring. The deposition of a nickel layer may be performed by means of an electroplating process, while a photoresist layer may be used for structuring. A groove or recess 1a is formed in the substrate 1 by removal of material, for example by sputter-etching or reactive ion etching, whereafter any remaining parts of the mask 3 are removed by, for example wet-chemical etching. A copper layer 5 is provided, for example, by means of sputtering on the substrate 1 thus structured. To improve the adhesion of copper to the ferrite material, a layer of an adhesive material may be formed before copper is provided.

The layer 5 has a copper surface 5a remote from the substrate 1, which surface is polished by means of the method according to the invention for obtaining a winding 7 serving as an inductive transducing dement and having an at least substantially plane surface 7a without scratches and defects. To this end an embodiment of the polishing means according to the invention is used, which in this example comprises 400 cc of polishing component, 400 cc of demineralised water and 160 cc of hydrogen peroxide. The polishing component comprises 50.4% by weight of $SiO_2$ particles in water in which $10^{-4}$ molar of a base is added. The particles have an average size of 36 nm. The pH is 10.1. The polishing means is moved across the surface 5a by means of a polishing base of organic fibres having a Shore D hardness of approximately 35 while simultaneously exerting a polishing pressure of approximately 500 g/cm$^2$. It has surprisingly been found that the polished copper surface 7a obtained perfectly adjoins the adjacent surface portions 1b of the substrate 1, in which height differences of less than 100 nm can easily be realised.

The surfaces 1b and 7a jointly form a smooth main surface 9 on which a layer 11 of a non-magnetic, electrically non-conducting material is formed. To this end, for example quartz or zirconia can be deposited by means of PE-CVD or sputtering, respectively. In this respect it is important that the layer 11 has an accurate uniform layer thickness because a portion of the layer 11 in the manufactured magnetic head functions as a transducing gap 11a (see FIG. 9).

In the layer 11 formed a connection aperture 13 is provided by means of a known technique, for example by chemical etching in the case of a quartz layer. Subsequently a soft-magnetic material, for example an NiFe alloy or a CoZrNb alloy is deposited by means of a known deposition technique for forming a flux-guiding layer 15. Subsequently the layer 15 is polished for forming a flux guide 15a and a head face 17 can be formed by means of grinding and/or polishing.

Figure 9:
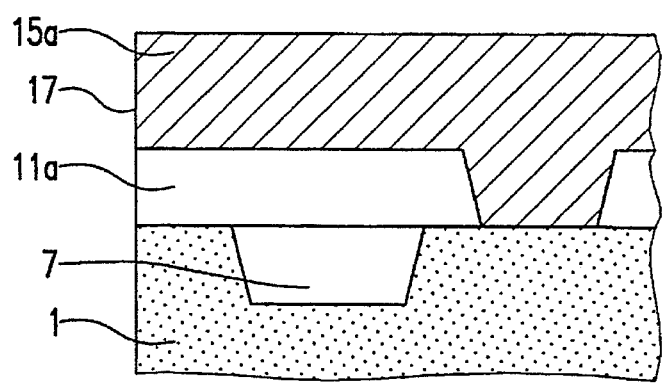
FIG. 9 shows a thin-film magnetic head, made by said method.

FIG. 9 shows a thin-film magnetic head obtained by means of the method described above. This magnetic head comprises an inductive element 7 of copper which is recessed in the substrate 1 and is provided with a magnetic yoke formed by the substrate 1 and the flux guide 15a and a non-magnetic transducing gap 11a.

It is to be noted that the method according to the invention is not limited to its use in processes of manufacturing magnetic heads, but is suitable for many applications in which strict requirements are imposed on the condition of copper surfaces or surfaces of alloys comprising mainly copper. The method may be used successfully, for example when manufacturing mirrors having a mirror surface of copper or a copper alloy. Such mirrors may be used, for example as X-ray radiation-collimating elements, as dispersive elements or as calibration samples in X-ray reflectometers. To prevent oxidation, the polished surface obtained by means of the method according to the invention may be coated with a thin layer of, for example 30 nm, of a noble metal such as gold.

Figure 10:
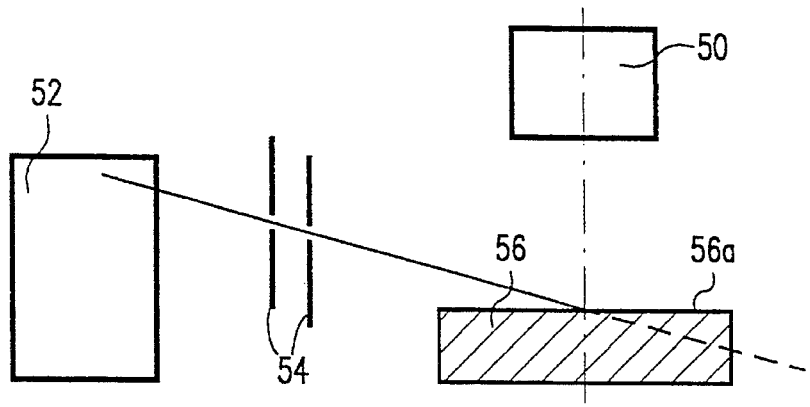
FIG. 10 shows diagrammatically a glancing incidence X-ray analysis device provided with a calibration sample.
Figure 11:
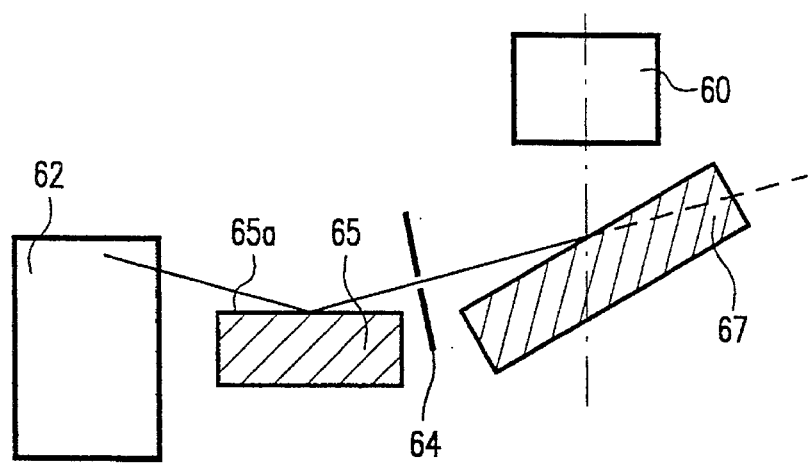
FIG. 11 shows diagrammatically a glancing incidence X-ray analysis device provided with a reflection element.

The devices shown in FIGS. 10 and 11 relate to glancing incidence X-ray analysis. Measurements can be performed with these devices for obtaining information about, inter alia layer thicknesses, interface roughnesses, lateral roughness correlations, composition profiles and thin-layer structures.

The device shown in FIG. 10 comprises an energy-dispersive spectrometer 50, an X-ray tube 52 and transmission gaps 54 for limiting the divergence of an X-ray beam incident on a calibration sample 56. The pivotably adjusted sample 56 has a surface 56a polished by means of the method according to the invention.

The device shown in FIG. 11 comprises an energy-dispersive spectrometer 60, an X-ray tube 62, a transmission gap 64 and a plane or curved mirror 65 for dispersive processing of an X-ray beam incident on a pivotable sample 67. The mirror 65 has a copper surface 65a polished by means of the method according to the invention.

Figure 12:
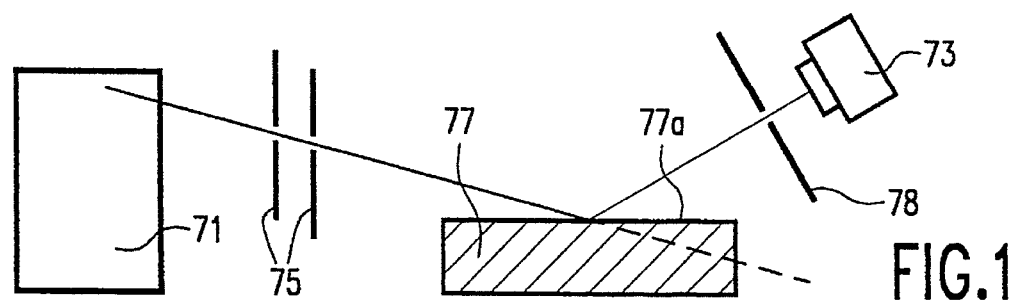
FIG. 12 shows diagrammatically a device for X-ray reflection measurements provided with a calibration sample.
Figure 13:
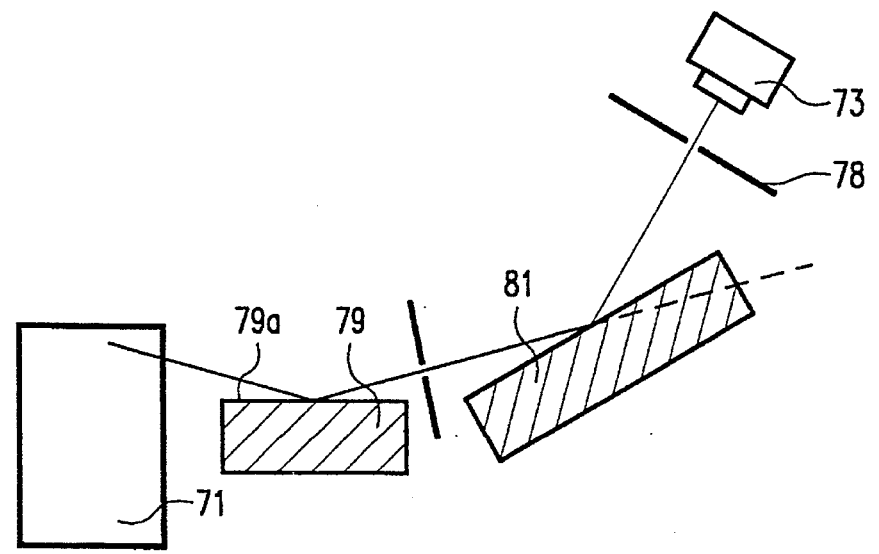
FIG. 13 shows diagrammatically a device for X-ray reflection measurements provided with a reflection element.

The devices shown in FIGS. 12 and 13 are provided with an X-ray tube 71 and a detector 73 each. The device of FIG. 12 also has transmission gaps 75 for limiting the divergence of X-ray radiation incident on a pivotable calibration sample 77, and a gap 78 in front of the detector which determines the acceptance angle of the radiation. The copper sample 77 has a surface 77a polished by means of the method according to the invention. The device of FIG. 13 has a mirror 79 for dispersive processing of radiation incident on a sample 81. The mirror 79 has a surface 79a obtained by means of the method according to the invention.

It is to be noted that the elements 65 and 79 in FIGS. 11 and 13 may have either a reflecting or a collimating character, dependent on the curvature of the elements.

It is to be noted that the invention is not limited to the embodiments shown. In addition to the previously mentioned example, successful experiments were performed with other embodiments of the polishing means according to the invention. In these experiments the volume ratios between the polishing component, demineralised water and chemical activator were 100:100:25, 100:60:50 and 100:60:40, respectively.

We claim:

1. A method of polishing a surface of copper or an alloy comprising mainly copper, comprising the steps of moving a polishing means and said surface with respect to each other while exerting a polishing pressure of between 400 and 600 $g/cm^2$ on said surface with said polishing means for obtaining a polished surface, the polishing means comprising a composition comprising a colloidal suspension of $SiO_2$ particles having an average particle size of between 20 and 50 nm in an alkali solution, demineralised water and a chemical activator, and the polishing means also comprising an absorbent polishing base having a hardness in the range between Shore A hardness 40 and Shore D hardness 90, characterized in that 60 to 100 units by volume of demineralized water and 25 to 50 units by volume of chemical activator are used for every 100 units by volume of colloidal suspension.

2. A method as claimed in claim 1, characterized in that the colloidal suspension comprises approximately 50% by weight of $SiO_2$ particles and approximately 50% by weight of the alkali solution, and in that the solution has a pH of approximately 10.

3. A method as claimed in claim 2, characterized in that the chemical activator is selected from the group consisting of hydrogen peroxide, an organic peroxide and a hypochlorite.

4. A method as claimed in claim 2, characterized in that prior to polishing, a layer having a surface of copper or an alloy comprising mainly copper is formed on a substrate.

5. A method as claimed in claim 1, characterized in that the chemical activator is selected from the group consisting of hydrogen peroxide, an organic peroxide and a hypochlorite.

6. A method as claimed in claim 5, characterized in that prior to polishing, a layer having a surface of copper or an alloy comprising mainly copper is formed on a substrate.

7. A method as claimed in claim 1, characterized in that prior to polishing, a layer having a surface of copper or an alloy comprising mainly copper is formed on a substrate.

8. A method as claimed in claim 7, characterized in that subsequent to polishing, a non-magnetic layer is deposited on the polished surface to form a transducing gap of a magnetic head.

9. A polishing composition suitable for use in the method as claimed in claim 1, comprising colloidal suspension of $SiO_2$ particles having an average particle size of between 20 and 50 nm in an alkali solution, demineralised water and a chemical activator, in which 60 to 100 units by volume of demineralised water and 25 to 50 units by volume of chemical activator are present for every 100 units by volume of colloidal suspension.

10. A polishing composition as claimed in claim 9, characterized in that the colloidal suspension comprises approximately 50% by weight of $SiO_2$ particles and in that the solution has a pH of substantially 10.

11. A polishing composition as claimed in claim 10, characterized in that the chemical activator is selected from the group consisting of hydrogen peroxide, organic peroxides and hypochlorites.

12. A polishing composition as claimed in claim 9, characterized in that the chemical activator is selected from the group consisting of hydrogen peroxide, organic peroxides and hypochlorites.

* * * * *